(No Model.)
G. BEEKMAN.
PICKING ROD OR BURR FOR COTTON HARVESTERS.
No. 313,277. Patented Mar. 3, 1885.
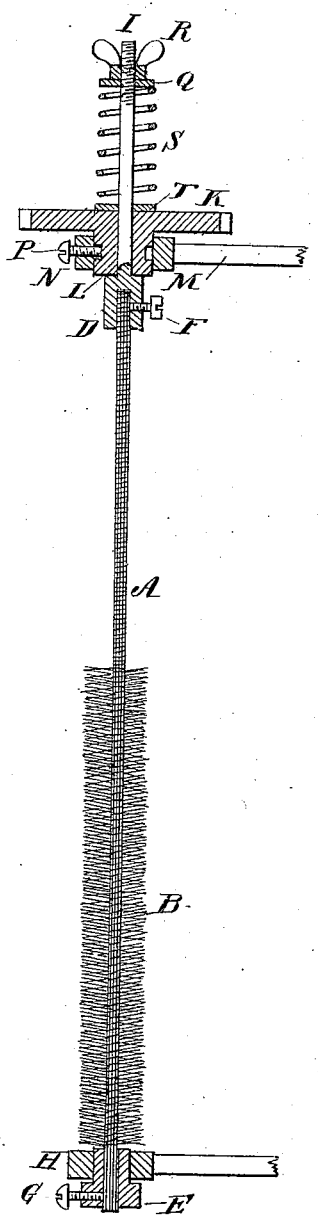
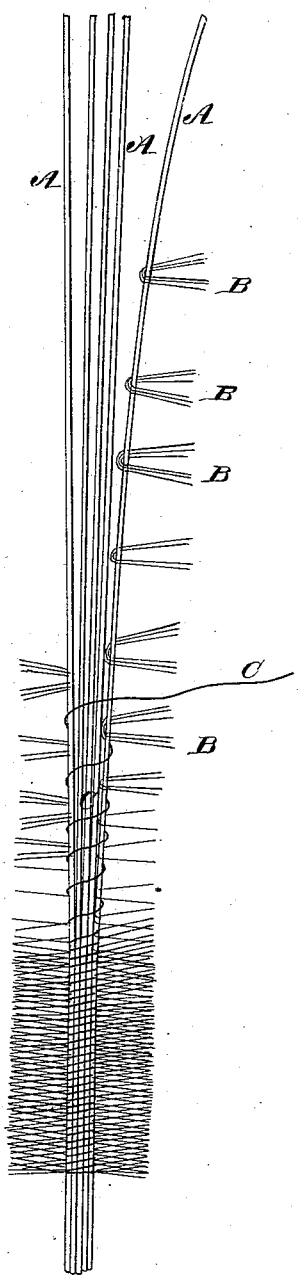
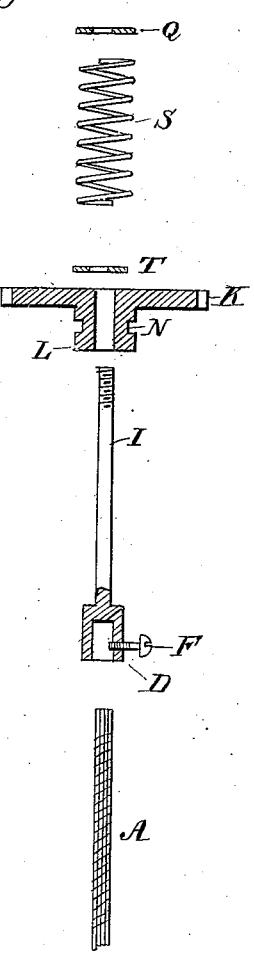
WITNESSES
INVENTOR:
Gerard Beekman
BY
ATTORNEY.

UNITED STATES PATENT OFFICE.

GERARD BEEKMAN, OF NEW YORK, N. Y.

PICKING ROD OR BURR FOR COTTON-HARVESTERS.

SPECIFICATION forming part of Letters Patent No. 313,277, dated March 3, 1885.

Application filed May 13, 1884. (No model.)

*To all whom it may concern:*

Be it known that I, GERARD BEEKMAN, a citizen of the United States, residing at New York, in the county of New York and State of New York, have invented a new and useful Improvement in the Picking Rods or Burrs for Cotton-Harvesters, of which the following is a specification.

My invention relates to improvements in the picking rods or burrs of the class of cotton-harvesters for which Letters Patent of the United States were granted to me May 25, 1880, No. 227,949; and the objects of my improvements are to provide an improved form of picking-rod in which the wires forming the burr are attached by a simple and inexpensive method, and in which the said burr will readily yield to unusual pressure without ceasing to act as a picker, and in which the picking-points can be arranged at different heights for reaching early or later crops.

I attain the objects of my present invention by the mechanism illustrated in the accompanying drawings, in which—

Figure 1 is a side elevation, partly in section, of my improved picking-rod, showing, also, part of the frame which carries it. Fig. 2 is a side view illustrating the method of attaching the wire picking-points. Fig. 3 shows views of the several parts shown in Fig. 1 detached from one another.

I do not limit the use of these picking-rods to the harvester described in my said Letters Patent No. 227,949, for they will be useful in other harvesters, and it is especially adapted to the harvester with "orrery" picking mechanism described in the application for Letters Patent filed herewith.

The picking-rod is composed of a number of stout flexible and resilient wires, A A, as shown in Fig. 2, around each of which, through a portion of their length, are looped or twisted wisps B B of the fine wire described in my said Patent No. 227,949, in such manner that the points will project outward. The projecting portions of the wire are preferably about half an inch in length, and they may be trimmed down to that length after being formed into the picking-rod; but I do not confine myself to any particular length, though pickers about an inch and a half in diameter are preferable.

While the wisps are being twisted or looped upon the wires, so as to form a burr, said wires are bound together by the wire C, as shown in Fig. 2, so that the fine-wire wisps may be held in place. The whole will then form a strong, durable, and flexible picking-burr, having the smallest practicable center with the greatest amount of fine picking-wire. When the picking portion of the rod A B has been completed, the ends of the main wires A A are inserted into suitable clamps, D E, and firmly held by the set-screws F G, Figs. 1 and 3. The lower clamp, E, passes through and revolves in a bearing, H, in the lower portion of the frame which carries the picker, and it has a shoulder projecting below said frame to hold the rod in place.

When the picking-rod is to be used in the orrery system of pickers shown in the application filed herewith, to which it is especially adapted, then H will indicate the lower star-shaped head of the revolving frame for the pickers therein described. The upper clamp, D, forms the lower end of the rod I, which passes loosely through the gear-wheel K, by means of which, as hereinafter stated, motion is given to the picking-rod. In some kinds of harvesters it may be useful to attach the rod I rigidly to the gear-wheel K; but in the kind of harvesters with orrery system of pickers, to which this picker is especially adapted, it is better to turn the picking-rod by frictional contact only with said wheel, for the following reason: As it leaves the plant, it is carried back to the cleaning-rollers or other cleaning apparatus, and the cotton is reeled around the picker in such a way that it would often be difficult to unreel it if the rod continued to rotate in the same direction as before. The friction-gear to rotate the picker allows the cotton to be unwound whenever the pull upon the cotton by the cleaners is of greater force than that which presses the frictional surfaces together. As soon as the cotton is unreeled, the friction-gear will exert its influence, and the picking-rod, when it comes into contact with the plants again, will be revolved as before.

The revolution of the picker by frictional contact with the gear-wheel is accomplished as follows: The gear-wheel K has a short projecting sleeve or hub, L, by which it is journaled in frame M. The lower end of this hub forms one of the frictional surfaces. Through this hub L passes loosely the rod I, which has the clamp D formed at its lower end, the shoulder of which clamp forms the other frictional surface, which, by its contact with the hub L, revolves the picker-rod.

When the picking-rod is used in the orrery system of pickers shown in the application filed herewith, then M will indicate the upper star-shaped head of the revolving frame shown therein.

In the hub L is a groove, N, into which projects the screw P, which prevents the hub from becoming detached from the frame M, in which it revolves.

The pressure between the frictional surfaces, upon the end of the hub L, and the shoulder of the clamp D is regulated as follows: The rod I projects above the gear-wheel K, and ends in a screw-thread, upon which is the thumb-screw R. Below this thumb-screw is the loose washer-plate Q, and between said plate and the gear-wheel K is the spring S, surrounding the rod I, and bearing at its lower end upon another washer, T, pressing upon the top of the gear-wheel. The effect of the spring S is to raise the rod I, so that the shoulder of the clamp D will be pressed against the base of the hub L. The amount of this pressure can be regulated by the thumb-screw. This frictional contact between the clamp D and the hub L causes the rod I, and with it the picking-rod A B, to revolve with the gear-wheel K. The thumb-nut R should be fitted sufficiently tight upon the threaded portion of the rod I to prevent said nut from being unscrewed by the turning of said rod, a contingency to which it would be liable if the two parts were loosely fitted to each other.

The thumb-screw enables the operator to regulate the amount of pressure exerted by the picking-points upon the cotton, the amount of pressure required depending upon the condition of the crop.

As the fibers of cotton are light and easily withdrawn from the bolls, little pressure is usually sufficient to extract it, and only a very light pressure of the frictional surfaces will then be required. With a pressure of a few ounces by the spring S, the rods will be effective as pickers, and the lighter this pressure the more easily can the picker be rotated in the other direction, and the cotton unreeled therefrom by the cleaning-rollers. It will thus be seen that the picking-rod can be readily turned in either direction and at any speed and independently of the drive-wheel by the pull of the cleaners upon the cotton wrapped around the picking-rod.

When the picking-rod comes in contact with an obstruction which might be sufficient to injure the picking-points if the revolution should continue, or if it becomes caught in the crotch of branches of the plant, it will then cease to revolve until released from the obstruction, when it will resume its motion, as before. The flexibility of the wires A allows the picking-rod to yield to ordinary pressure while the revolution continues.

The advantage of having the picking-points at one end only of the rod A B, as shown in Fig. 1, is that, as the cotton ripens from below, it will be necessary only to have the points in a position to reach the ripe cotton on the lower branches, and when the cotton on the upper part of the plant is ready for harvesting the rod A B may be loosened from the clamps D and E and inserted in an inverted position. Thus not only is there a saving in the cost of the rod A B, but also the limbs of the plant above or below the ripe cotton will have greater space and be subjected to less friction. I do not, however, confine the picking-rod A B to the exact form shown, shod with wire half-way only, for the whole rod may be covered, or any part of it.

That which I claim as my invention, and desire to secure by Letters Patent, is—

1. In a machine for harvesting cotton, a picking-rod composed of stout flexible wires, with wisps of fine wire looped around them, and the whole bound together, substantially as described.

2. In a machine for harvesting cotton, the reversible picking-rod A B, secured in clamps D E, adapted to revolve in a suitable frame, and provided with picking-points through a portion of its length, substantially as described.

3. In a machine for harvesting cotton, the combination of a picking-rod, and a continuously-rotating driving-wheel adapted to rotate said rod by frictional contact therewith, whereby the rod is capable of being revolved in either direction independently of said wheel by any force sufficient to overcome the friction between the two, substantially as described.

4. In a machine for harvesting cotton, the picking-rod A B, rotating at its lower end in a suitable frame, and attached at its upper end to the rod I, which rotates in said frame, in combination with the spring S, regulating-screw R, and the wheel K, substantially as described.

GERARD BEEKMAN.

Witnesses:
C. WYLLYS BETTS,
J. E. HINDON HYDE.